United States Patent

[11] 3,625,821

| [72] | Inventor | Herbert E. Ricks<br>Pittsburgh, Pa. |
|---|---|---|
| [21] | Appl. No. | 740,218 |
| [22] | Filed | June 26, 1968 |
| [45] | Patented | Dec. 7, 1971 |
| [73] | Assignee | Westinghouse Electric Corporation<br>Pittsburgh, Pa.<br>Continuation-in-part of application Ser. No. 499,407, Oct. 21, 1965, now abandoned.<br>This application June 26, 1968, Ser. No. 740,218 |

[54] FUEL-ELEMENT COATING CONTAINING BURNABLE POISON
4 Claims, 3 Drawing Figs.

[52] U.S. Cl. .................................................. 176/68,
176/91, 176/93
[51] Int. Cl. ........................................................ G21c 3/06
[50] Field of Search ............................................ 176/68, 82,
87, 91, 91 SP, 93, 93 BP

[56] References Cited
UNITED STATES PATENTS

| 3,103,476 | 9/1963 | Mumm ........................ | 204/193.2 |
| 3,268,307 | 8/1966 | Tomaszewski .............. | 29/194 |
| 3,427,222 | 12/1969 | Biancheria .................. | 176/91 X |

FOREIGN PATENTS

| 634,711 | 1/1962 | Canada ........................ | 176/93 |
| 622,416 | 6/1961 | Canada ........................ | 176/93 |
| 1,299,978 | 6/1962 | France ........................ | 176/93 BP |

OTHER REFERENCES

Kapl- 1726, Neisz 8 McKittrick, 6/15/57 " Development of Zircaloy-Clad, Discrete Burnable Poison Element for S3G/S4G."

Primary Examiner—Carl D. Quarforth
Assistant Examiner—Gary G. Solyst
Attorneys—F. Shapoe and Lee P. Johns ABSTRACT: A fuel element for a nuclear reactor having a fuel cladding tube with the inner surface of tube being coated with a retaining metal of low neutron capture cross section and having finely dispersed particles of a burnable poison disposed therein.

PATENTED DEC 7 1971
3,625,821
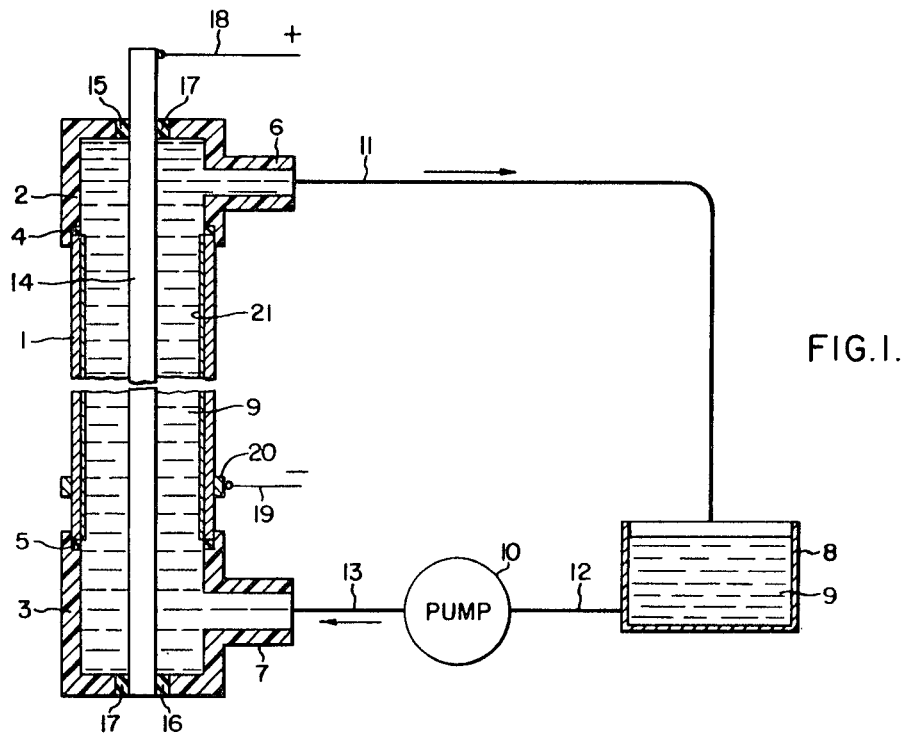
FIG.I.
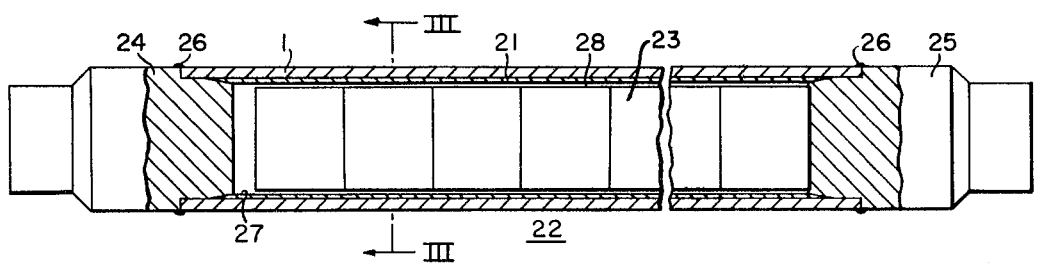
FIG.2.
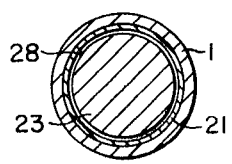
FIG.3.
WITNESSES
Edwin E. Bassler
James F. Young
INVENTOR
Herbert E. Ricks
BY Lee P. Johns
ATTORNEY

FUEL-ELEMENT COATING CONTAINING BURNABLE POISON

CROSS-REFERENCE TO RELATED APPLICATIONS

This application is a continuation in part of copending application Ser. No. 499,407, filed Oct. 21, 1965, now abandoned.

BACKGROUND OF THE INVENTION

Field of the Invention

This invention relates to a fuel element cladding tube having a retaining metal plated on the inner tube surface and boron particles in the plated metal.

Description of the Prior Art

When nuclear reactors are used for electric power generations, it is desirable to extend the length of time between fuel loadings to obtain maximum efficiency. For that purpose, excess reactivity is provided in fresh fuel loads and this excess reactivity is controlled by the use of a burnable poison located in a zone adjacent to the fuel. A burnable poison such as boron is intentionally introduced into a nuclear reactor core in a predetermined amount to capture a desired number of excess neutrons during the early stages of operation of a fresh fuel charge. As it captures neutrons, the burnable poison is burned out at about the same rate as the excess neutrons are dissipated, thus maintaining a constant reactivity in the reactor core and extending the life of a given charge of fuel.

Attempts to introduce a burnable poison at various locations including fuel pellets per se, fuel pellet coatings, and in fuel cladding tubes, have met with mixed results. Prior attempts, however, to apply a coating of burnable poison to the inner surface of fuel cladding tubes have not been satisfactory.

It has been found that boron compounds can be incorporated in a plating of another metal such as nickel on the inner surface of the fuel cladding tube in a manner which overcomes most prior art difficulties.

Accordingly, it is an object of this invention to provide a process for electroplating a layer comprising boron on a fuel cladding tube.

It is another object of this invention to provide a process for electroplating a composite coating of nickel and boron on a stainless steel tube.

It is another object of this invention to provide an aqueous electrolyte containing boron compounds as the portable metal.

Other objects of the invention will in part be obvious and will in part appear hereinafter.

SUMMARY OF THE INVENTION

Briefly, the invention is particularly directed to a nuclear fuel cladding tube for containing pellets of fissionable material, which tube is coated on the inner surface with a burnable poison, such as boron in combination with another metal, such as nickel, which other metal serves as a vehicle for applying and retaining the boron in place on the surface of the tube. The invention also involves a method of electrodepositing the layer comprising a combination of boron and nickel on the inner surface of a fuel cladding tube.

BRIEF DESCRIPTION OF THE DRAWING

For a better understanding of the nature and objects of this invention, reference is made to the following detailed description and drawings, in which:

FIG. 1 is a diagrammatic view of the apparatus and process by which a fuel element cladding tube is provided with an inner surface coating of burnable poison, FIG. 2 is a sectional view of a nuclear fuel element having a coating of burnable poison on the inner surface of the cladding tube, and FIG. 3 is a sectional view taken on the line III—III of FIG. 2.

Similar numerals refer to similar parts throughout the several views of the drawings.

DESCRIPTION OF THE PREFERRED EMBODIMENTS

In FIG. 1, an elongated fuel cladding tube 1 is mounted for the application on its interior surface of a composite coating of nickel and boron. The upper and lower ends of the tube 1 are closed in a fluidtight manner by closure fittings 2 and 3 with fluid seals 4 and 5 disposed therebetween. The fittings 2 and 3 are preferably composed of a dielectric material such a plastic for example, polytetrafluoroethylene, and are provided with fluid ports 6 and 7, respectively.

A container 8 is used as a reservoir for a plating solution 9 which solution is circulated through the tube 1 by a pump 10. For that purpose, a plurality of interconnecting solution conduits 11, 12, and 13 are provided between the ports 6 and 7 and the container 8 and pump 10. Thus, during the plating procedure, the solution 9 is circulated in a continuous circuit through the tube 1.

In addition to the foregoing, an elongated anode 14 is disposed axially of the tube 1 which anode is mounted in apertures 15 and 16 in the fittings 2 and 3, respectively. Similar seals 17 are provided to prevent leakage of the solution 9 from the fittings 2 and 3. Lead wires 18 and 19 are connected respectively to the anode 14 and the tube 1 which serves as a cathode. The wires 18 and 19 lead to a source of direct current. The wire 19 is attached to the tube by a ring clamp 20.

The tube 1 to be coated has an outer diameter of three-eighths inch and a length of 6 to 10 feet. It is adapted to contain a plurality of nuclear fuel pellets of uranium dioxide ($UO_2$) which extend throughout the length of the tube. The tube is composed of a low neutron capture cross section metal such as stainless steel types 307 or 347, zirconium or zircaloy.

The anode 14, which may be soluble or insoluble, preferably being insoluble, and is composed of platinum or another nonreactive metal. It is approximately one-eighth inch in diameter. The anode 14 extends throughout the length of the tube 1 where it is centrally retained by the closure fittings 2 and 3 during the coating procedure.

Before it is coated, the inner surface of the tube 1 is cleaned with trichloroethylene to remove grease and other contaminants and is then repickled in an Hf-HNO3 solution.

The plating solution 9 employs one of the conventional nickel-plating baths, such as shown in the following table, which is modified in accordance with this invention to include an insoluble suspended constituent, either finely divided boron nitride (BN), titanium boride ($TiB_2$), or zirconium boride, or a combination of two or more.

TABLE I.—NICKEL PLATING BATHS

Compositions in ounces per gallon

| Constituent or condition | Watts bath | Chloride bath | Sulfamate bath | Fluoborate bath |
|---|---|---|---|---|
| Soluble constituents: | | | | |
| Nickel sulfate, $NiSO_4 \cdot 6H_2O$ | 30–60 | | | |
| Nickel chloride, $NiCl_2 \cdot 6H_2O$ | 4–8 | 30–50 | 0–4 | 0–2 |
| Nickel sulfamate, $Ni(SO_3NH_2)_2$ | | | 35–60 | |
| Nickel fluoborate, $Ni(BF_4)_2$ | | | | 30–40 |
| Boric acid $H_3BO_3$ | 4–6 | 4–6 | 4–6 | 2–6 |
| Insoluble constituents: | | | | |
| Boron nitride, BN | 1–100 | 1–100 | 1–100 | 1–100 |
| Titanium boride, $TiB_2$ | 1–100 | 1–100 | 1–100 | 1–100 |
| Zirconium boride, $ZrB_2$ | 1–100 | 1–100 | 1–100 | 1–100 |
| pH | 1.5–5.2 | 2 | 3–5 | 2.5–4 |
| Temperature, °F | 100–140 | 120–140 | 115–160 | 100–160 |
| Current density, amp./ft.$^2$ | 10–100 | 25–100 | 25–300 | 25–300 |

A typical fuel element is generally disclosed at 22 in FIG. 2. It includes the fuel cladding tube 1 having the coating 21, and a plurality of cylindrical nuclear fuel pellets 23 of $UO_2$ disposed in end-to-end abutment. The opposite ends of the tube 1 are closed by sealing means such as end plugs 24 and 25. Annular welds 26 secure the plugs 24 and 25 in place so that a chamber 27 within the tube is hermetically sealed. The pellets 23 have a slightly smaller diameter than the diameter of the inner surface of the coating 21, whereby a clearance space 28 is provided therebetween.

An example of an operable fuel element 22 in accordance with this invention may have an outside diameter of 0.444 inch and may have a length varying within wide limits depending upon the nuclear reaction chamber in which it is to be disposed. The diameter of the fuel element however usually will be less than 0.500 inch. For a fuel element for a given reactor, the pellets 23 have a diameter of about 0.400 inch. The clearance space 28 is about 0.004 inch to allow for radial thermal expansion of the pellets 23 when the fuel element 22 is operating at the elevated temperatures of operation of the reactor. The coating 21 may have a thickness of about 0.0002 inch but for special coated purposes may be up to 6 mils thick depending upon desired operating conditions of the reactor. The amount of boron present preferably also may vary from about 0.09 to 0.7 milligram per square centimeter of tube surface, the preferred range being from 0.10 to 0.6 mg./cm.$^2$. The optimum amount of boron is about 0.35 milligram per square centimeter of tube surface.

Although nickel is used as a matrix metal almost any metal, providing it is suitable in a fuel element by reason of a low neutron absorption cross section and is inert and solid at reactor temperatures, capable of being electrodeposited, may be employed. For example, iron, manganese, and chromium may be used. Such coatings are usually harder through the matrix metal and exhibit unusually good wear characteristics. When the sulfamate bath is used, it is modified by the addition of an insoluble powdered boron compound of a −200-mesh grit size which is stirred into the bath and suspended. Various boron compounds may be used such as boron nitride (BN), titanium boride ($TiB_2$) or zirconium boride ($ZrB_2$), either separately or in combination. The amount of the compound is from 1 to 100 ounces per gallon with the optimum quantity being 2 percent by weight of the total weight of the bath, or about 3.5 ounces per gallon. Inasmuch as the boron compounds which are employed (BN, $TiB_2$, and $ZrB_2$) are insoluble in the typical sulfamate bath shown in table I, the bath must be constantly agitated by stirring or continuously circulated through a closed circuit during the deposition of a coating 21 on the inner surface of the tube 1.

For deposition of the coating, a direct current of 1 to 2000 amperes per square foot (asf) is used at about 2 to 6 volts. The preferred current density is 1 to 200 asf with the optimum being about 25 asf for a time of about 12 minutes to provide a deposit or coating thickness of 0.0002 inch. The time is an inverse function of the current density and may vary from 15 seconds to 4 hours.

The bath temperature may vary from 60° to 215° F. with an optimum of about 140° F.

The pH for the modified sulfamate solution varies from 0.5 to 6.8; the optimum being about 3.5.

EXAMPLE

The interior of fuel tubes composed of type 307 stainless steel were coated with a burnable poison for use in prototype tests. An acidic plating solution was used having 60 ounces per gallon of nickel sulfamate, 4 ounces per gallon of boric acid, 100 ounces per gallon of 325-mesh titanium boride, and having a pH of 3.5 and at a temperature of 140° F. A deposit thickness of 0.0002 inch was plated while the plating solution of the sulfamate type was stirred by pumping it through the tube in a manner shown in the drawing to keep the boron compound suspended. The surfaces were plated at a current density of 25 amperes per square foot for 12 minutes to deposit nickel containing occluded boride particles. In a subsequent test boron nitride (BN) was substituted for titanium boride ($TiB_2$). The following table shows the boron content of the deposits:

TABLE II

Boron Compound Used And Resulting Coating Content

| Sample No. | Boron Compound Added | pH | Boron in Coating wt. % |
|---|---|---|---|
| 1-3 | BN | 3.5 | 0.010 to 0.012 |
| 4 | $TiB_2$ | 3.5 | 0.066 |
| 5 | $TiB_2$ | 3.5 | 0.071 |
| 6 | $TiB_2$ | 6.0 | 0.032 |

From the table, it is evident that boron nitride results in boron coatings of boron compound having 0.010 to 0.012 weight percent. However, higher boron contents 0.066 and 0.071 weight percent are obtained when titanium boride is used for the same pH acid concentrations namely 3.5. The 0.071 percent boron content corresponds to 3.48 milligrams of boron per square centimeter of plated area for a 2-mil thick coating and 0.35 milligram for a 0.2-mil thick coating. However, heavier coatings can be plated for special purposes, with up to about 10 milligrams of boron on each square centimeter of plated area for a 6-mil thick coating. Where the pH is increased, the titanium boride resulted in a lower content of boron in the coatings namely 0.032 weight percent. Samples nos. 4, 5, and 6 were found to be fully satisfactory for nuclear use. Increasing the deposition time and/or current density increases the amount of boron compound deposited.

All of the coatings deposited on the stainless steel tubing have a matrix of pure nickel with finely dispersed particles of the boron compound uniformly distributed therein and unalloyed with the nickel. Thus, the nickel serves as a vehicle for holding the burnable poison (boron) in place on the inner surface of the tubing. These tubes are loaded with $UO_2$ fuel pellets, sealed and are found to meet the requirements for a long life fuel element in a nuclear reactor.

I claim:

1. A fuel element for use in a nuclear reactor comprising a metal tube having an internal space of predetermined dimensions, a plurality of pellets of fissionable material disposed in end-to-end abutment within the space and of dimensions spacing them precisely from the inner surface of the tube and being composed of nickel as a retaining metal having a thickness of from about 0.0002 to 0.006 inch, the coating also being composed of finely dispersed particles of a material comprising boron disposed in the matrix of said retaining metal, the material providing boron in an amount comprising from about 0.09 to 0.7 mg./cm.$^2$, and the coating containing about 0.032 to 0.07 weight percent of boron.

2. The fuel element of claim 1 in which the amount of boron is about 0.35 mg./cm.$^2$.

3. The fuel element of claim 1 in which the nickel retaining metal is replaced by a metal selected from the group consisting of chromium, iron, and manganese.

4. The fuel element of claim 1 in which the metal tube is composed of a metal selected from the group consisting of type 307 stainless steel, type 347 stainless steel, and zircaloy.

* * * * *